(No Model.)
W. N. LE PAGE.
MANUFACTURE OF ISINGLASS, &c.
No. 243,713. Patented July 5, 1881.
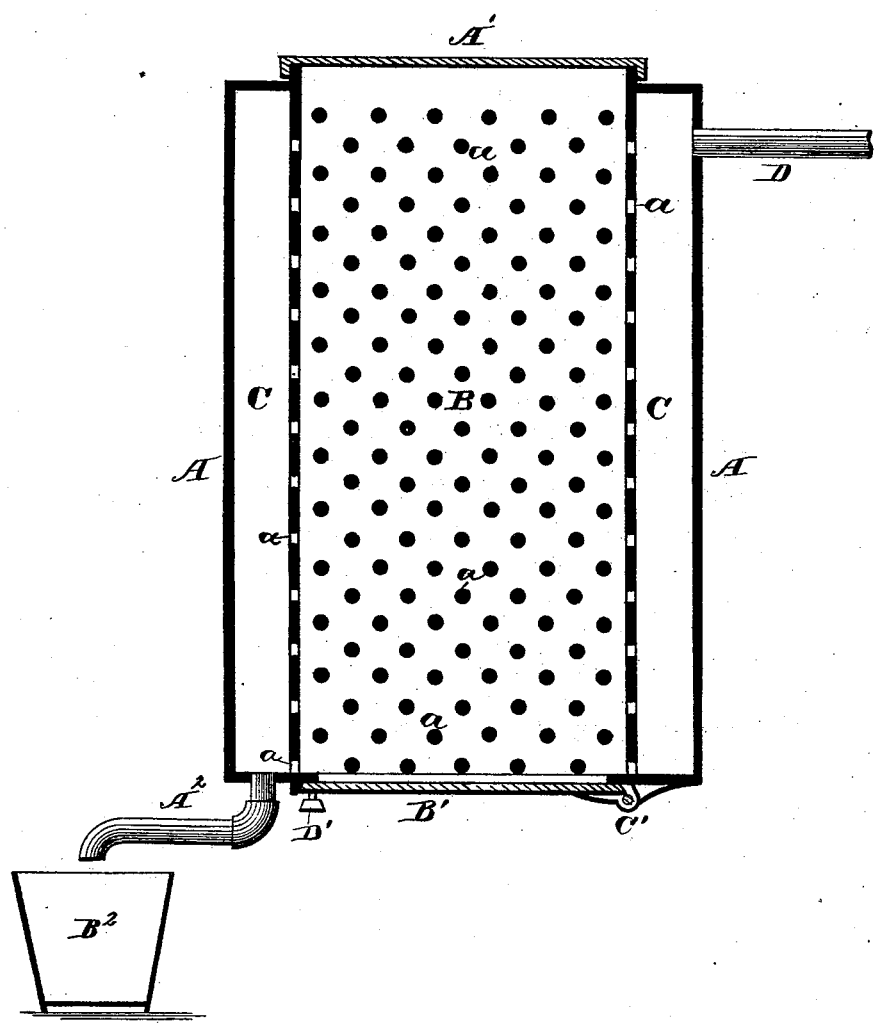
WITNESSES
E. Nottingham
A. L. Lawrence
INVENTOR
Wm N Le Page.
By J F A Seymour.
ATTORNEY

UNITED STATES PATENT OFFICE.

WILLIAM N. LE PAGE, OF ROCKPORT, MASSACHUSETTS.

MANUFACTURE OF ISINGLASS, &c.

SPECIFICATION forming part of Letters Patent No. 243,713, dated July 5, 1881.

Application filed December 29, 1880. (No model.)

*To all whom it may concern:*

Be it known that I, WILLIAM N. LE PAGE, of Rockport, in the county of Essex and State of Massachusetts, have invented certain new and useful Improvements in Manufacture of Isinglass or Ichthyocolla from Fish Tissues; and I do hereby declare the following to be a full, clear, and exact description of the invention, such as will enable others skilled in the art to which it pertains to make and use it, reference being had to the accompanying drawing, which forms part of this specification.

My invention relates to an improved process in the manufacture of isinglass or ichthyocolla from salted fish-skins.

Heretofore in the extraction of isinglass from fish-skins they have been immersed in water and boiled until the gelatinous element present in their tissues has been dissolved and separated therefrom. The result of this process is a solution of gelatine in water, which latter must be eliminated, together with other foreign matter or matters dissolved by the action of the boiling water on the fish-skins, by a series of precipitations and evaporations before it is fit for the market.

It has been discovered, by long and careful experiment and study, that after gelatine has been first dissolved, if the temperature of the water in which it is contained in solution is maintained at 212° Fahrenheit, certain chemical changes take place, which greatly impair the adhesive properties of the article. In the practical production of isinglass from fish-skins the danger of boiling them too long is great, as all the gelatine is not separated at once, but is gradually dissolved from the skins. It is impossible to withdraw the gelatine from the fire as rapidly as it is dissolved, because it is contained in the solution in which the skins are immersed, and therefore, from an economical standpoint, it is desirable to continue the boiling and dissolve as large an amount of gelatine as possible. The point at which this chemical change, before alluded to, takes place is not definitely ascertainable, and much gelatine is overcooked and its value impaired. Another objection against the methods now employed is that in boiling the skins organic matters are dissolved therefrom and discolor the solution. The process of evaporating the solution is also a very delicate one, and is largely dependent on atmospheric conditions. The time employed in preparing the solution for the market will thus depend on the strength of the solution. If, now, a process can be devised by means of which the gelatinous element in fish-skins may be obtained without immersing them in water, a superior article is produced at a cheaper rate of production, inasmuch as the danger of overcooking is avoided, the evaporation of the liquid gelatine is rendered very simple, and the prepared isinglass is tough, flexible, and brilliant in appearance, in case it is evaporated to dryness, and as there is a minimum of organic matter present of a superior white or pale color.

The object of my invention is, then, to surmount the objections and difficulties in the process hereinbefore described; and it consists in certain apparatus and process for extracting gelatine from salted fish-skins, as will hereinafter be described, and pointed out in the claims.

The accompanying drawing shows a view, in vertical cross-section, of an improved apparatus for steaming fish-skins or other fish tissues constructed in accordance with my invention.

Let A represent a vessel of any approved form, and constructed of any suitable material, metal preferred. In this vessel A another vessel, B, of similar form is inserted, the inner vessel, B, being enough smaller than the outer vessel to form an annular chamber, C, between the two, entrance being had for steam into the said annular chamber C through a steam-supply pipe, D. The vessel B is provided at its upper and lower ends with entrance and exit doors or covers A' B' for the fish-skins.

A' represents a cover fitting over the top of the said vessel B, and through which the fish-skins are introduced into the vessel B, where they are acted upon by the decomposing power of steam, which is admitted under low pressure through steam-supply pipe D.

B' represents a hinged door at the bottom of vessel B, through which the skins are withdrawn from the vessel after they have been deprived of their gelatinous element. The drawing shows the door or bottom to be hinged at C' and provided with a locking device at D'.

The vessel B, as will be seen, is provided with a great number of foraminations or perforations, a, which serve the twofold office of admitting steam from the chamber C into the vessel B, where it acts upon and dissolves the gelatine in the fish-skins, and of forming outlets for the gelatine set free by the steam. The said gelatine, passing through the foramination a, will descend into the bottom of the annular chamber C, and from thence flow through discharge pipe A² into a suitable receptacle, as at B².

Having described the construction of my improved apparatus, I will briefly describe its *modus operandi*.

Fish-skins, previously desalted and descaled if need be, are introduced into the inner vessel, B, through the cover or door A'. The cover is now closed steam-tight and steam, generated in devices exterior to the device under consideration, is admitted under low pressure through the steam-supply D into the annular chamber C, where it is allowed to expand and enter through the perforations a into the vessel B. The decomposing properties of steam are well known, and its effect will be to permeate the skins and free the gelatinous element contained in their tissues, said gelatine being discharged through the perforations a into the annular chamber C, and from thence into a receptacle provided therefor through discharge-pipe A².

It will be seen that as the gelatine is discharged as fast as it is liberated there can be no chance of overcooking. The product thus obtained is consequently of uniform quality. The gelatine will be produced in a pure state, and can be prepared for the market with slight labor and expense, and the apparatus, time, labor, and the danger accompanying the successful evaporation of gelatine, as obtained in solution, is in great measure avoided. Again, there will be a smaller per cent. of organic matter in the pure fish-gelatine than in the gelatine obtained by the evaporation of the solution in which the skins were immersed. The quality of the product will thus be superior to that produced by the old methods, as it will be of better color, tough, flexible, and brilliant in appearance, or, if it is designed to be used in a liquid form, it will be clearer and of superior adhesive qualities.

The object of introducing the steam to the vessel containing the fish-skins under pressure is that it may the more thoroughly permeate the body of the skins.

It is apparent that the devices shown for steaming fish-skins are not limited in use to that portion alone, but any portion of the fish, their skins, sounds, other gelatine-yielding tissues, and even their bones, may be treated in this manner with satisfactory results.

I am aware that gelatine has been extracted from the heads of fish by placing the heads in a tight vessel, subjecting them to the action of steam, then removing the heads and subjecting them to powerful pressure to expel the gelatine therefrom, and hence I would have it understood that I make no claim to such process.

In my improved process one of the essential steps of the process consists in desalting the fish-skins before they are subjected to the action of steam, and, further, the gelatine is expelled by the action of the steam upon the skins without resorting to pressure for that purpose.

Having fully described my invention, what I claim as new, and desire to secure by Letters Patent, is—

1. The process of obtaining gelatine from salted fish-skins, consisting, essentially, in first desalting the fish-skins and afterward subjecting them to the decomposing action of steam, substantially as set forth.

2. An apparatus for extracting gelatine from fish tissues, consisting of an outer steam jacket or cylinder and inner perforated vessel for holding the fish-skins, a door or cover at both top and bottom of the perforated vessel or cylinder, and suitable steam induction and eduction pipes, substantially as set forth.

In testimony that I claim the foregoing I have hereunto set my hand.

WILLIAM NELSON LE PAGE.

Witnesses:
ALFRED PARSONS,
REUBEN BROOKS.